United States Patent
Shao et al.

(10) Patent No.: US 10,774,708 B2
(45) Date of Patent: Sep. 15, 2020

(54) GASOLINE PARTICULATE FILTERS WITH HIGH INITIAL FILTERING EFFICIENCY AND METHODS OF MAKING SAME

(71) Applicant: Afton Chemical Corporation, Richmond, VA (US)

(72) Inventors: Huifang Shao, Midlothian, VA (US); Joseph W. Roos, Mechanicsville, VA (US); Joseph E. Remias, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 60 days.

(21) Appl. No.: 16/121,236

(22) Filed: Sep. 4, 2018

(65) Prior Publication Data

US 2020/0072102 A1 Mar. 5, 2020

(51) Int. Cl.

| | |
|---|---|
| *F01N 3/021* | (2006.01) |
| *F01N 11/00* | (2006.01) |
| *F02B 47/04* | (2006.01) |
| *C10L 10/06* | (2006.01) |
| *B01D 46/42* | (2006.01) |
| *C09D 1/00* | (2006.01) |
| *C10M 163/00* | (2006.01) |

(Continued)

(52) U.S. Cl.
CPC .............. *F01N 3/021* (2013.01); *B01D 46/42* (2013.01); *C09D 1/00* (2013.01); *C10L 10/06* (2013.01); *C10M 163/00* (2013.01); *F01N 11/00* (2013.01); *F02B 47/04* (2013.01); *F02D 41/0235* (2013.01); *B01D 2275/302* (2013.01); *B01D 2279/30* (2013.01); *C10M 2227/09* (2013.01); *C10N 2010/14* (2013.01); *C10N 2040/25* (2013.01); *F01N 2260/14* (2013.01)

(58) Field of Classification Search
CPC .......... F01N 3/021; F01N 11/00; C10L 10/06; F02B 47/04
See application file for complete search history.

(56) References Cited

U.S. PATENT DOCUMENTS

| | | |
|---|---|---|
| 2,425,755 A | 8/1947 | Roberts et al. |
| 2,425,845 A | 8/1947 | Toussaint et al. |

(Continued)

FOREIGN PATENT DOCUMENTS

| | | | |
|---|---|---|---|
| EP | 0384086 | 8/1990 | |
| EP | 1657291 A1 * | 5/2006 | ................ C10L 1/12 |

OTHER PUBLICATIONS

Campen et al., Growing use of synlubes, Special Report: Lubes for the Future, Hydrocarbon Processing, vol. 61, No. 2, Feb. 1982, pp. 75-82.

(Continued)

*Primary Examiner* — Audrey K Bradley
(74) *Attorney, Agent, or Firm* — Honigman LLP

(57) ABSTRACT

Gasoline Direct Injection (GDI) engines require gasoline particulate filters (GPFs) as a key component of the emissions control system to reduce particulate emissions. GPFs are known to have poor initial performance, with performance increasing after the filter develops a cake. This poor initial performance make it impossible to accurately assess vehicle emissions performance at the mileage requirements for vehicle certification. Compositions and methods are disclosed to improve filtration efficiency in a fresh or low mileage GPF.

4 Claims, 1 Drawing Sheet

(51) Int. Cl.
*F02D 41/02* (2006.01)
*C10N 40/25* (2006.01)
*C10N 10/14* (2006.01)

(56) References Cited

U.S. PATENT DOCUMENTS

| | | | |
|---|---|---|---|
| 2,448,664 A | 9/1948 | Fife et al. |
| 2,457,139 A | 12/1948 | Fife et al. |
| 3,438,757 A | 4/1969 | Honnen et al. |
| 3,454,555 A | 7/1969 | Van Der Voort et al. |
| 3,485,601 A | 12/1969 | Mehmedbasich |
| 3,565,804 A | 2/1971 | Honnen et al. |
| 3,573,010 A | 3/1971 | Mehmedbasich |
| 3,574,576 A | 4/1971 | Honnen et al. |
| 3,671,511 A | 6/1972 | Honnen et al. |
| 3,746,520 A | 7/1973 | Mehmedbasich |
| 3,756,793 A | 9/1973 | Robinson |
| 3,763,244 A | 10/1973 | Shubkin |
| 3,780,128 A | 12/1973 | Shubkin |
| 3,844,958 A | 10/1974 | Anderson et al. |
| 3,849,085 A | 11/1974 | Kreuz et al. |
| 3,852,258 A | 12/1974 | Flay |
| 3,864,098 A | 2/1975 | Honnen |
| 3,876,704 A | 4/1975 | Nakaguchi |
| 3,884,647 A | 5/1975 | Nakaguchi |
| 3,898,056 A | 8/1975 | Honnen |
| 3,950,426 A | 4/1976 | Culbertson |
| 3,960,515 A | 6/1976 | Honnen |
| 4,022,589 A | 5/1977 | Alquist et al. |
| 4,039,300 A | 8/1977 | Chloupek et al. |
| 4,128,403 A | 12/1978 | Honnen |
| 4,152,499 A | 5/1979 | Boerzel et al. |
| 4,166,726 A | 9/1979 | Harle |
| 4,168,242 A | 9/1979 | Soula |
| 4,172,855 A | 10/1979 | Gluckstein et al. |
| 4,191,537 A | 3/1980 | Honnen et al. |
| 4,218,330 A | 8/1980 | Shubkin |
| 4,231,759 A | 11/1980 | Udelhofen et al. |
| 4,236,020 A | 11/1980 | Lewis et al. |
| 4,238,628 A | 12/1980 | Cahill et al. |
| 4,288,612 A | 9/1981 | Lewis et al. |
| 4,605,808 A | 8/1986 | Samson |
| 4,877,416 A | 10/1989 | Campbell |
| 4,950,822 A | 8/1990 | Dileo et al. |
| 5,034,471 A | 7/1991 | Blackborow |
| 5,086,115 A | 2/1992 | Clarke |
| 5,089,029 A | 2/1992 | Hashimoto et al. |
| 5,112,364 A | 5/1992 | Rath et al. |
| 5,124,484 A | 6/1992 | Brown et al. |
| 5,300,701 A | 4/1994 | Cherpeck |
| 5,322,529 A | 6/1994 | Buckley, III |
| 5,514,190 A | 5/1996 | Cunningham et al. |
| 5,522,906 A | 6/1996 | Hashimoto et al. |
| 5,634,951 A | 6/1997 | Colucci et al. |
| 5,697,988 A | 12/1997 | Malfer et al. |
| 5,725,612 A | 3/1998 | Malfer et al. |
| 5,755,835 A | 5/1998 | Cherpeck |
| 5,814,111 A | 9/1998 | Graham et al. |
| 5,873,917 A | 2/1999 | Daly |
| 5,876,468 A | 3/1999 | Moreton |
| 6,048,373 A | 4/2000 | Malfer et al. |
| 2016/0123201 A1* | 5/2016 | Silver .................. F01N 3/035 60/274 |
| 2016/0363019 A1 | 12/2016 | Warner et al. |
| 2018/0017012 A1 | 1/2018 | Suchta et al. |

OTHER PUBLICATIONS

Newton, Propylene Oxide Polymers and Higher 1,2-Epoxide Polymers, Kirk-Othmer Encyclopedia of Chemical Technology, Third Edition, 1982, pp. 633-645, vol. 18, John Wiley & Sons.

Gasoline Particulate Filter (GPF) How can the GPF cut emissions of ultrafine particles from gasoline engines?, AECC, Nov. 2017, pp. 1-10.

Environmental Protection Agency, Part IV, Rules and Regulations, Federal Register, vol. 71, No. 10, Jan. 17, 2006, pp. 2810-2842.

* cited by examiner

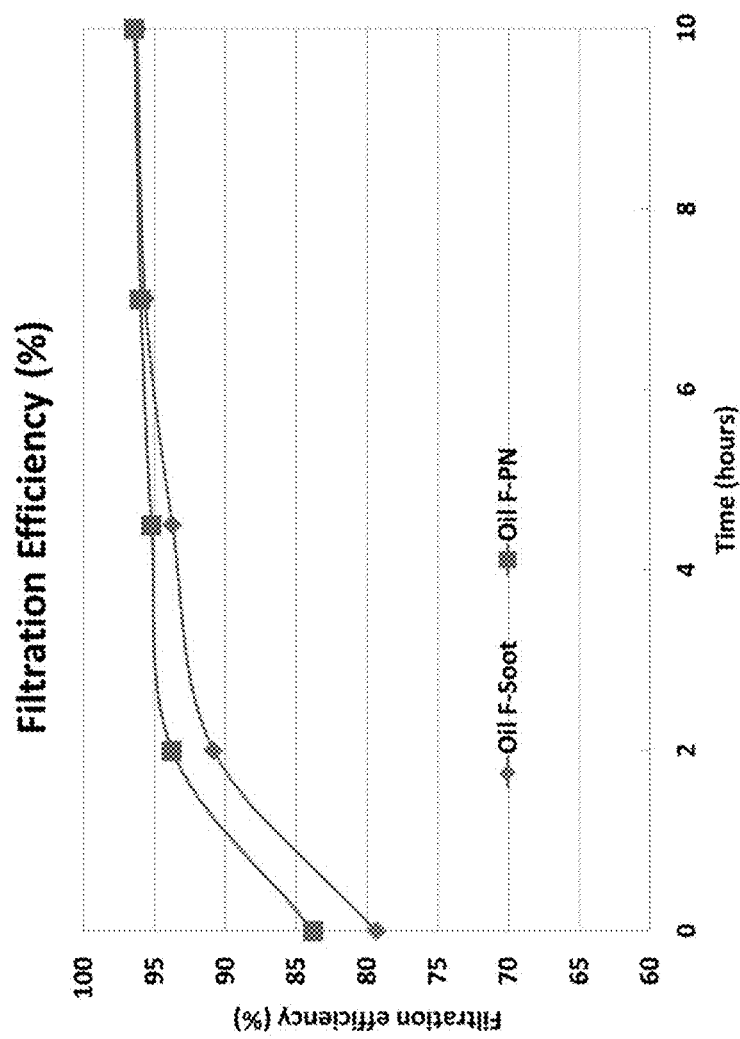

GASOLINE PARTICULATE FILTERS WITH HIGH INITIAL FILTERING EFFICIENCY AND METHODS OF MAKING SAME

TECHNICAL FIELD

The disclosure relates to gasoline particulate filters employed in the exhaust systems of gasoline direct injection engines.

BACKGROUND

While conventional port fuel injection (PFI) gasoline engines have extremely low particulate emissions, newer gasoline direct injection (GDI) engines have higher particulate emissions comparable to diesel engines. Gasoline particulate filters (GPF) have been introduced to the automotive market for the exhaust systems of GDI engines to reduce particulate emissions. Unfortunately, fresh, newly installed GPF have relatively low initial filtration efficiencies.

The low filtration efficiency for a fresh or low-mileage GPF results from the need to establish cake filtration in the GPF as particulate matter removed from the exhaust stream builds up on the filter substrate. The transition from bed filtration to cake filtration is relied on to achieve high filtration performance with minimum back pressure and filter size. Once cake filtration is achieved, the filter will continue to work with very little change to filtration efficiency throughout the service life of the unit.

In automobiles, this transition must be achieved rapidly to meet certification testing requirements for particulate emissions. Due to the limited operating time available to automakers to condition cars ahead of certification testing (on the order of hundreds to thousands of kilometers, depending on the test), the accumulation of sufficient particles to establish cake filtration via normal vehicle operation is difficult to achieve during the certification testing window. Engineers currently design the filter to compensate for poor initial efficiency by sizing up the filter, increasing the porosity, modifying the pore size distribution, and other changes that improve initial filtration efficiency. These design-arounds create a host of new problems, including cost, packaging constraints, and challenges to effectively distributing the exhaust stream across the filter. Therefore, methods for rapidly achieving high filtration efficiency are needed to permit more efficient filter design and to meet certification testing limits.

SUMMARY

Based on the problems as set forth above, there is a need to rapidly establish cake filtration, which is not achievable by normal vehicle operation, in order to accurately assess vehicle emissions for certification and achieve low mileage compliance. Further, there is a need for automakers to optimize filter designs for lifetime performance in the absence of these initial performance constraints. The present disclosure relates to high initial efficiency particulate filters that have been pretreated to achieve cake filtration before or shortly after installation in the exhaust system.

In one aspect, the particulate filter is a newly manufactured, pre-service gasoline particulate filter comprising pores, wherein the pores are at least partially filled with a particulate substance. In some examples, the pre-service gasoline particulate filter provides a filtration efficiency of at least 80% after 100 initial miles. In some examples, the particulate substance comprises at least one of a soot surrogate substance, an ash surrogate substance, and an aggregate particulate substance. In some examples, the particulate substance comprises one or more of silica powder, alumina powder, talc, gypsum, soot, ash, flours, starches, and salts. In some examples, the particulate substance is present on the gasoline particulate filter in an amount of at least about 0.5 gram/L. In other examples, the particulate substance is present on the gasoline particulate filter in an amount up to about 6 grams/L. In some examples, the particulate substance comprises a plurality of particles, wherein each particle has a diameter from about 10 nanometers to about 200 micrometers. In some examples, the particulate substance comprises one or more of a surrogate soot substance, a surrogate ash substance, and an aggregate surrogate substance.

In another aspect, methods of pretreating a gasoline particulate filter comprise contacting the gasoline particulate filter comprising pores with a particulate substance prior to installing the gasoline particulate filter in a vehicle to produce a pre-treated gasoline particulate filter, wherein the pores are at least partially filled with the particulate substance. In some examples, the particulate substance comprises one or more of a surrogate soot substance, a surrogate ash substance, and an aggregate surrogate substance. In some examples, the particulate substance comprises one or more of silica powder, alumina powder, talc, gypsum, soot, ash, flours, starches, and salts. In some examples, the particulate substance comprises a plurality of particles, wherein each particle has a diameter from about 10 nanometers to about 200 micrometers. In some examples, the contacting is via pneumatic conveyance of the particulate substance into the gasoline particulate filter. In some examples, the pre-treated gasoline particulate filter produced by the method is operable to provide a filtration efficiency of greater than 80% after 1000 initial miles.

In another aspect still, methods of increasing the initial in-service filtration efficiency of a gasoline particulate filter comprise contacting a newly installed gasoline particulate filter with an exhaust stream comprising particulate matter derived from a priming composition. In some examples, the priming composition may comprise a fuel additive composition. In some examples, the priming composition may be added to the fuel used for the initial tank fill(s). Alternatively, the priming composition may be placed directly in the fuel tank prior to adding the fuel. In some examples, the priming composition comprises an organometallic compound comprising manganese. In cases where the priming composition is added to fuel, the organometallic compound is present in the priming composition in an amount effective to provide about 2 to about 36 milligrams of manganese per liter of priming composition. In some examples, the organometallic compound is methylcyclopentadienyl manganese tricarbonyl (MMT).

In yet another aspect, methods of increasing an initial in-service filtration efficiency of a gasoline particulate filter comprise contacting a gasoline particulate filter with an exhaust stream comprising particulate matter derived from a priming composition. In some examples, the priming composition comprises a lubricant formulation. Because migration of a lubricant formulation into the fuel is limited, the lubricant formulation may be added to the fuel for the initial tank fill or the first few tank fills. Alternatively, the lubricant formulation may be placed directly in the fuel tank prior to adding the fuel. In some examples, the priming composition comprises at least one compound containing a chemical element selected from the group consisting of Ca, Mg, Mo, Zn, P, Ti, Mn, W, Na, and K. In some examples, the priming composition further comprises a fuel. In some examples, the priming composition comprises a lubricant formulation in an amount of no more than 3 wt. % based on the weight of the priming composition. In some examples, the lubricant formulation comprises a sulfated ash value (SASH) of at least 3%, as measured by ASTM D874 (2018).

In some examples, the method further comprises measuring a filtration efficiency of the gasoline particulate filter contacted with the priming composition, wherein the filtration efficiency is greater than 80% after 100 initial miles. In other examples, the filtration efficiency is greater than 80% after 100 initial miles. In some examples, the method further comprises treating a fuel tank with the priming composition during original equipment manufacturing, and adding a fuel to the fuel tank.

The following definitions of terms are provided in order to clarify the meanings of certain terms as used herein.

The terms "oil composition," "lubrication composition," "lubricating oil composition," "lubricating oil," "lubricant composition," "lubricating composition," "fully formulated lubricant composition," "lubricant," "crankcase oil," "crankcase lubricant," "engine oil," "engine lubricant," "motor oil," and "motor lubricant" are considered synonymous, fully interchangeable terminology referring to the finished lubrication product comprising a major amount of a base oil plus a minor amount of an additive composition.

As used herein, the terms "additives", "additive package," "additive concentrate," "additive composition," "engine oil additive package," "engine oil additive concentrate," "crankcase additive package," "crankcase additive concentrate," "motor oil additive package," "motor oil concentrate," are considered synonymous, fully interchangeable terminology referring the portion of the lubricating oil composition excluding the major amount of base oil stock mixture. The additive package may or may not include the viscosity index improver or pour point depressant.

As used herein, the term "percent by weight", unless expressly stated otherwise, means the percentage the recited component represents to the weight of the entire composition.

The terms "soluble," "oil-soluble," or "dispersible" used herein may, but does not necessarily, indicate that the compounds or additives are soluble, dissolvable, miscible, or capable of being suspended in the oil in all proportions. The foregoing terms do mean, however, that they are, for instance, soluble, suspendable, dissolvable, or stably dispersible in oil to an extent sufficient to exert their intended effect in the environment in which the oil is employed. Moreover, the additional incorporation of other additives may also permit incorporation of higher levels of a particular additive, if desired.

The term "TBN" as employed herein is used to denote the Total Base Number in mg KOH/g as measured by the method of ASTM D2896 or ASTM D4739 or DIN 51639-1.

The term "alkyl" as employed herein refers to straight, branched, cyclic, and/or substituted saturated chain moieties of from about 1 to about 100 carbon atoms.

The term "alkenyl" as employed herein refers to straight, branched, cyclic, and/or substituted unsaturated chain moieties of from about 3 to about 10 carbon atoms.

The term "aryl" as employed herein refers to single and multi-ring aromatic compounds that may include alkyl, alkenyl, alkylaryl, amino, hydroxyl, alkoxy, halo substituents, and/or heteroatoms including, but not limited to, nitrogen, oxygen, and sulfur.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

LISTING OF THE FIGURES

FIG. 1 is a graph of time vs. filtration efficiency for a comparative GPF and a GPF treated by the methods described herein.

DETAILED DESCRIPTION

The adoption of gasoline direct injection (GDI) technology is currently driven by the European Union (EU) climate change policy. About 40% of new non-diesel passenger car registrations in the EU in 2015 were GDIs. While GDIs are fuel efficient, thus reducing carbon dioxide emissions, fine particle emissions may be higher than the current Euro 6C limit of $6\times10^{11}$ particles per kilometer under real driving conditions, according to a 2017 publication by the Association for Emissions Control by Catalyst (AECC) entitled "Gasoline Particulate Filter (GPF): How can the GPF cut emissions of ultrafine particles from gasoline engines" (hereafter "AECC 2017 publication"), which is herein incorporated by reference. GPFs are effective for reducing particulate emissions once operating in cake filtration mode after a soot cake has developed in the filter. GPFs may optionally be coated with a three-way catalyst (TWC). The present disclosure relates to both uncoated and coated GPFs.

As described briefly above, a significant problem with GDI technology is that newly installed gasoline particulate filters (GPFs) have a low filtration efficiency when operating in bed filtration mode prior to sufficient particle build-up in the pores of the GPF to permit operation in cake filtration mode. Fresh GPF filtration efficiency can be as low as 30%. This low initial filtration efficiency will affect the emission performance during the certification to low mileage compliance. GPFs currently must be designed with pore sizes optimized for sufficiently high filtration before a soot cake is developed in the filter. Thus, the instant disclosure advantageously allows for greater choices in design criteria such as pore size by providing good initial filtration while also permitting certification testing that is reflective of GPF lifetime performance.

The GPF filter mechanism has two primary filtration modes: bed filtration and cake filtration. At the early stage of GPF use, particles will be trapped first in the pores of the GPF in a process called bed filtration. This stage of filtration is characterized by relatively low filtration efficiency and rapid increase in back pressure. As particles continue to enter the GPF, the filtration media pores are filled with particulate matter to produce a filtration cake, leading to a transition from bed filtration mode to cake filtration mode once the particles deposit along the channel wall. Cake filtration will remain efficient until the filter reaches the threshold where the accumulated cake leads to significant backpressure rise due to channel blockage. However, this threshold is reached when the accumulated cake is sufficient to clog the filter, which usually occurs beyond the design service life for the filter.

Particulate emissions consist of soot particles and ash particles, which can aggregate to form larger aggregate particles. GDI engines need emission control technologies to meet the regulatory requirements for reduced particulate emission. Under normal operating conditions, the accumulation rate of soot is much faster than the accumulation of ash for GPFs. For GDI vehicles, the cake accumulation rate is much slower than that of diesel. Thus, GDI vehicles require extended operating time and/or mileage before the GPF reaches cake filtration mode in which the filtration efficiency can be high enough to reduce the particulate emissions to compliant levels.

Primary soot and ash particles typically have a diameter of less than 10 nm. The aggregate particles can have an average primary particle diameter of from about 7 nm to about 60 nm. Primary particles may associates to form aggregates that can have a diameter exceeding 200 nm, according to the AECC 2017 publication.

For GPF usage, a significant challenge is improving the early filtration efficiency within low initial mileage, such as 100 initial miles, 250 initial miles, 500 initial miles, 1,000 initial miles, 2,000 initial miles, 3,000 initial miles, 4,000 initial miles, 5,000 initial miles, 6,000 initial miles, 7,000 initial miles, 8,000 initial miles, 9,000 initial miles, or 10,000 initial miles. Initial miles refers to the first miles of operation of an engine after a GPF is installed in the engine's exhaust system, and may correspond to the mileage specified for certification testing. Filtration performance may be measured by road test or by bench test. In some examples where the testing is bench testing, the filtration efficiency may be measured after an engine operating time.

Compositions and methods are provided to rapidly achieve cake filtration by introducing dopants to intentionally create a cake in a shorter period of engine operation than is possible by conventional engine operation alone. A first solution provided herein is to treat the GPF external to the vehicle engine and exhaust system prior to installation, using compositions and methods that will establish the necessary cake properties. Treating the GPF external to the vehicle can be accomplished during the production of the GPF prior to fitting it to the vehicle, so that a pretreated filter could be provided by an original equipment manufacturer (OEM). The treatment includes adding a particulate substance comprising particles to the GPF. A second solution provided herein is to add an additive to the fuel system during a period of initial operation. These fuel additives will produce combustion products comprising soot and/or ash during initial GDI engine operation at a rate sufficient to rapidly achieve cake filtration in the GPF.

Pretreated Gasoline Particulate Filters

Pretreated gasoline particulate filters are disclosed. The pretreated GPF includes a pre-service gasoline particulate filter comprising pores, with the pores at least partially filled with a particulate substance in an amount sufficient to achieve cake filtration upon pretreated GPF installation in the vehicle. "Pre-service filter" refers to a filter that has been manufactured, but has not yet been installed in a vehicle. In some examples, the GPF pores are at least partially filled with a particulate substance. In some examples, the GPF pores are at least fifty percent (50%) filled by volume with a particulate substance. In other examples, the pores are at least 10%, at least 20%, at least 30%, at least 40%, at least 60%, at least 70%, at least 80%, at least 90%, at least 95%, at least 97%, at least 98%, or at least 99% filled by volume with a particulate substance.

The addition of the dopant to a GPF to form a pretreated GPF will cause an increase in GPF weight as compared to a non-doped GPF of the same type. In some cases, the pretreated GPF weight is increased by at least 0.01%, by at least 0.02%, by at least 0.03%. In some examples, the pretreated GPF weight is increased by up to 3%, by up to 1.5%, by up to most 2%, by up to 1.5%, by up to 1%, by up to 0.5%, by up to 0.1%, or by up to 0.05% compared to the GPF prior to treatment. For example, if an untreated filter weighs 1000 grams prior to treatment and weighs 1010 grams after treatment, the GPF weight has increased by 1%.

In some examples, the particulate substance includes an inorganic ash surrogate substance and/or a soot surrogate substance. Any particulate substance that can partition into the filter pores may be used as an inorganic ash surrogate substance and/or a soot surrogate substance. Thus, the diameter of the particles of the particulate substance must be equal to or smaller than the pore size of the filter. In some examples, the particulate substance is an organic compound. In other examples, the particulate substance is an inorganic compound. In some examples, the particulate substance is a metal oxide. In some examples, the particulate substance includes one or more of silica powder, alumina powder, talc, gypsum, soot, ash, flours, starches, and salts. A person of ordinary skill will understand that any particulate substance comprising particles and/or particulate aggregates that are appropriately sized to the pores of the GPF may be utilized.

In some examples, the particulate substance is present on the gasoline particulate filter in an amount of at least about 0.5 grams per liter (g/L) of filtration substrate. The filter internal volume is the volume of space inside the filter housing that is occupied by the filtration substrate. In some examples, the particulate substance is present on the gasoline particulate filter in an amount up to about 6 grams/L. In some examples, the particulate substance is present on the gasoline particulate filter in an amount from about 0.5 g/L to about 6 g/L, from about 0.75 g/L to about 5.5 g/L, from about 1 g/L to about 5 g/L, from about 0.5 g/L to about 3 g/L, or from about 3 g/L to about 6 g/L.

In some examples, the particulate substance includes a plurality of particles, wherein each particle of the plurality of particles has a diameter from about 0.01 micrometers to about 200 micrometers. In other examples, each particle in the plurality of particles has a diameter from about 0.05 micrometers to about 95 micrometers, from about 0.10 micrometers to about 90 micrometers, from about 0.15 micrometers to about 85 micrometers, or from about 0.20 micrometers to about 80 micrometers. In some examples, at least 99% of the particles in the plurality of particles have an average diameter as specified herein. In other examples, at least 98%, at least 97%, at least 96%, or at least 95% of the particles in the plurality of particles have an average diameter as specified herein. In some examples, no more than 5% of the particles have an average diameter of greater than 200 micrometers. In some examples, no more than 5% of the particles have an average diameter of less than 0.01 micrometers.

The particle size distribution of the surrogate substance may be controlled to achieve cake filtration with a minimal amount of particulate substance. In some cases, the particle size distribution is from 1.1 to 2.0 (e.g., from 1.2 to 1.9, from 1.3 to 1.8, or from 1.4 to 1.7). In other cases, the particle size distribution is 1.2, 1.3, 1.4, 1.5, 1.6, 1.7, 1.8, 1.9, or 2.0.

In some examples, the particulate substance includes a plurality of particles having a bimodal distribution of particle diameters. For example, a soot surrogate substance may have a smaller average diameter, and an ash surrogate substance may have a larger average diameter. In some examples, the plurality of particles includes particles having a first average diameter and particles having a second average diameter. In some examples, the first average diameter is from about 0.25 micrometers to about 2.5 micrometers. In other examples, the first average diameter is from about 0.30 micrometers to about 2.3 micrometers, from about 0.35 micrometers to about 2.0 micrometers, from about 0.40 micrometers to about 1.8 micrometers, from about 0.45 micrometers to about 1.5 micrometers, or from about 0.50 micrometers to about 1.0 micrometers. In some examples, the second average diameter is from about 2.5 micrometers to about 10 micrometers. In other examples, the second average diameter is from about 2.8 micrometers to about 9 micrometers, from about 2.5 micrometers to about 8 micrometers, from about 3.0 micrometers to about 7 micrometers, from about 3.5 micrometers to about 6 micrometers, or from about 4 micrometers to about 5 micrometers.

Filtration efficiency is calculated by measuring the count of particles of greater than or equal to a particle diameter at the filter inlet and the filter outlet, and expressing the number of particles exiting the filter divided by the number of particles entering the filter, expressed as a percentage, during certain testing conditions. Testing conditions can include on road testing, laboratory testing over driving cycle, engine steady state testing. In some examples, particles have a diameter of greater than or equal to 23 nanometers, 10 nanometers, or 5 nanometers are counted. For example, if 1000 particles of per second are measured at the filter inlet and 400 particles per second are measured at the filter outlet, the filtration efficiency is (1000-400)/1000×100=60%. In some instances, filtration efficiency of a pretreated GPF installed in a newly manufactured vehicle may be measured after two hours of GDI engine operating time. The engine may be operated within a vehicle in a road test, or may be operated external to a vehicle in a bench test. In some examples, the gasoline particulate filter provides a filtration efficiency of greater than 80% after two hours of GDI engine time. In other examples, the gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99% after two hours of GDI engine time. In some cases, the engine is operated according to a Standard Cycle Test.

Alternately, filtration efficiency may be measured after a certain number of initial miles. In some examples, the gasoline particulate filter provides a filtration efficiency of greater than 80% at 1000 initial miles. In some examples, the pretreated GPF provides a filtration efficiency of greater than 80% at 100 initial miles, at 250 initial miles, at 500 initial miles, at 750 initial miles, at 800 initial miles, at 900 initial miles, at 1,000 initial miles, at 2,000 initial miles, at 3,000 initial miles, at 4,000 initial miles, at 5,000 initial miles, at 6,000 initial miles, at 7,000 initial miles, at 8,000 initial miles, at 9,000 initial miles, or at 10,000 initial miles. In other examples, gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99% at 1000 initial miles. In other examples, gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99% at 100 initial miles.

Pre-Installation Methods of Treating Gasoline Particulate Filters

Methods of pretreating gasoline particulate filters are also disclosed herein. In some examples, the methods include contacting a gasoline particulate filter including pores with a particulate substance prior to installing the gasoline particulate filter in a vehicle to produce a pretreated gasoline particulate filter. In some examples, the pores are at least fifty percent (50%) filled by volume with a particulate substance. In other examples, the pores are at least 10%, at least 20%, at least 30%, at least 40%, at least 60%, at least 70%, at least 80%, at least 90%, at least 95%, at least 97%, at least 98%, or at least 99% filled by volume with a particulate substance. The addition of the dopant to a GPF to form a pretreated GPF will cause an increase in GPF weight as compared to a non-doped GPF of the same type. In some cases, the pretreated GPF weight is increased by at least 0.01%, by at least 0.02%, by at least 0.03%. In some examples, the pretreated GPF weight is increased by up to 3%, by up to 1.5%, by up to most 2%, by up to 1.5%, by up to 1%, by up to 0.5%, by up to 0.1%, or by up to 0.05% compared to the GPF prior to treatment.

The particulate substance may include any of the materials listed above and may have any of the particle sizes and particle size distributions listed above.

In some instances, filtration efficiency of a pretreated GPF installed in a newly manufactured vehicle may be measured after two hours of GDI engine time. In some examples, the gasoline particulate filter provides a filtration efficiency of greater than 80% after two hours of GDI engine time. In other examples, the gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99%, after two hours of GDI engine time.

Alternately, filtration efficiency may be measured after a certain number of initial miles. In some examples, the gasoline particulate filter provides a filtration efficiency of greater than 80% at 1000 initial miles. In some examples, the pretreated GPF provides a filtration efficiency of greater than 80% at 100 initial miles, at 250 initial miles, at 500 initial miles, at 750 initial miles, at 800 initial miles, at 900 initial miles, at 1,000 initial miles, at 2,000 initial miles, at 3,000 initial miles, at 4,000 initial miles, at 5,000 initial miles, at 6,000 initial miles, at 7,000 initial miles, at 8,000 initial miles, at 9,000 initial miles, or at 10,000 initial miles. In other examples, gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99% at 1000 initial miles. In other examples, gasoline particulate filter provides a filtration efficiency of greater than 75%, greater than 85%, greater than 90%, greater than 91%, greater than 92%, greater than 93%, greater than 94%, greater than 95%, greater than 96%, greater than 97%, greater than 98%, or greater than 99% at 100 initial miles.

In some cases, the particulate substance may be deployed to the pores of the GPF via a pneumatic conveyance, although other methods of insertion such as carrying the particulate substance into the pores by flow of a fluid such as a gas (such as air, nitrogen, carbon dioxide, or argon) or an organic solvent will be apparent to those skilled in the art. Numerous powder particulate substances could achieve this goal with non-limiting examples including silica powder, alumina powder, talc, gypsum, soot, flour, or corn starch with a particle diameter of between 10 micrometers and 200 micrometers. While a wide variety of particle sizes are available commercially, the powders could be milled or classified to obtain the desired particle size and particle size distribution.

Post-Installation Methods of Treating Gasoline Particulate Filters

A. Fuel Additives as Dopants

Additional methods of increasing the initial in-service filtration efficiency of a gasoline particulate filter (GPF) are disclosed herein. These methods increase the cake accumulation rate through in-situ exposure of the GPF to an exhaust stream including the combustion products of a fuel that is doped which particulate-producing substances. Using a priming composition in the fuel will result in production of particulate material that will rapidly build a cake. Thus, a "priming composition" includes a substance capable of producing particulate substance upon combustion.

In some examples, a fuel additive is used neat as the priming composition. A person of ordinary skill will understand that any additive that contributes to soot or ash production may be used.

One particularly appealing application is to place one or more fuel and/or lubricant additives of the present invention in the fuel tank as the first tank of fuel during in vehicle construction (i.e., factory fluid fill). The additive may be delivered neat or at a high concentration in a carrier, and is dissolved in fuel once fuel is added to the fuel tank. This factory-fill fluid conditions the GPF for emissions within the first tank fill(s) of fuel enabling optimum emissions to be quickly established. Alternately, the additive is added to the fuel used for the first or first few tank fills, such as the first one, two, three, four, or five tank fills. The filtration efficiency of a GPF installed in a newly manufactured vehicle and exposed to particulate matter produced by the priming composition can be quantified by initial miles and/or engine time, as described above, and can have any of the values described above.

In some examples, the methods employ a conventional fuel additive that is soluble in fuel, such as an organometallic compound, that can generate ash during the combustion process to accumulate ash in the GPF filtration substrate. The additive may be neutral to the combustion process, soluble in base oil and/or fuel, and compatible with the TWC system. One example of such a compound is an organometallic compound such as methylcyclopentadienyl manganese tricarbonyl (MMT). Optionally, to ensure correct balance of chemistry in the combustion products, additional fuel components may be added. These compounds include various fuel soluble phosphorous or sulfur compounds. Based on the need for approximately 0.4 grams of ash per liter of internal filter volume to achieve 80% filtration efficiency, an MMT treat rate of about 8.3 mg Mn per liter of fuel (mg Mn/L) in several fuel tanks would be sufficient for pretreating a particulate filter. MMT would serve the additional benefit of enhancing the octane in the vehicle during initial mileage, thus improving vehicle performance. In some examples, MMT is present in the fuel in an amount from about 2 mg Mn/L to about 36 mg Mn/L (e.g., from about 4 mg Mn/L to about 32 mg Mn/L, from about 4 mg Mn/L to about 30 mg Mn/L, from about 6 mg Mn/L to about 26 mg Mn/L, from about 6 mg Mn/L to about 20 mg Mn/L, from about 2 mg Mn/L to about 16 mg Mn/L, or from about 16 mg Mn/L to about 32 mg Mn/L.

In general, the additives are not completely combusted during engine operation, and thus at least a portion of the additives will pass into the exhaust system to provide particulate matter to the GPF. In some cases, the additives may be partially combusted before passing into the exhaust system. In some cases, the non-combustible additive may include an organometallic compound. In some examples, the organometallic compound is selected from the group consisting of methylcyclopentadienyl manganese tricarbonyl (MMT) and ferrocene. In some examples, the organometallic compound is methylcyclopentadienyl manganese tricarbonyl.

In some examples, the organometallic compound contains manganese and is present in the priming composition in an amount effective to provide about 2 to about 36 milligrams of manganese per liter of priming composition. In other examples the organometallic compound is present in the priming composition in an amount effective to provide about 4 to about 30 milligrams, about 5 to about 25 milligrams, about 2 to about 20 milligrams, or about 20 to about 36 milligrams of manganese per liter of priming composition.

In some cases, the priming composition further includes a fuel suitable for the engine in the vehicle in which the filter will be installed. In cases where the priming composition further includes a fuel, any fuel or fuel compositions that is suitable for the engine may be used.

Hydrocarbon Fuel: The base fuels used in formulating the fuel compositions of the present disclosure include any base fuels suitable for use in the operation of gasoline engines configured to combust fuel at the high fuel pressures discussed herein. Suitable fuels include leaded or unleaded motor gasolines, and so-called reformulated gasolines which typically contain both hydrocarbons of the gasoline boiling range and fuel-soluble oxygenated blending agents ("oxygenates"), such as alcohols, ethers and other suitable oxygen-containing organic compounds. Preferably, the fuel is a mixture of hydrocarbons boiling in the gasoline boiling range. This fuel may consist of straight chain or branch chain paraffins, cycloparaffins, olefins, aromatic hydrocarbons or any mixture of these. The gasoline can be derived from straight run naptha, polymer gasoline, natural gasoline or from catalytically reformed stocks boiling in the range from about 80° to about 450° F. The octane level of the gasoline is not critical and any conventional gasoline may be employed in the practice of this invention.

Oxygenates suitable for use in the present disclosure include methanol, ethanol, isopropanol, t-butanol, mixed C1 to C5 alcohols, methyl tertiary butyl ether, tertiary amyl methyl ether, ethyl tertiary butyl ether and mixed ethers. Oxygenates, when used, will normally be present in the base fuel in an amount below about 30% by volume, and preferably in an amount that provides an oxygen content in the overall fuel in the range of about 0.5 to about 5 percent by volume.

Detergents:

Additional fuel additives may be employed. For example, such supplemental additives may include dispersants/detergents, antioxidants, carrier fluids, metal deactivators, dyes, markers, corrosion inhibitors, biocides, antistatic additives, drag reducing agents, demulsifiers, emulsifiers, dehazers, anti-icing additives, antiknock additives, anti-valve-seat recession additives, lubricity additives, surfactants, combustion improvers, and mixtures thereof.

A suitable additional additive may be a Mannich base detergent such as a separate intake valve deposit (IVD) control additive including a Mannich base detergent. Suitable Mannich base detergents for use in the fuel compositions herein include the reaction products of a high molecular weight alkyl-substituted hydroxyaromatic compound, aldehydes and amines. If used, the fuel composition may include about 45 to about 1000 ppm of a Mannich base detergent as a separate IVD control additive.

In one approach, the high molecular weight alkyl substituents on the benzene ring of the hydroxyaromatic compound may be derived from a polyolefin having a number average molecular weight (Mn) from about 500 to about 3000, preferably from about 700 to about 2100, as determined by gel permeation chromatography (GPC) using polystyrene as reference. The polyolefin may also have a polydispersity (weight average molecular weight/number average molecular weight) of about 1 to about 4 (in other instances, about 1 to about 2) as determined by GPC using polystyrene as reference.

The alkylation of the hydroxyaromatic compound is typically performed in the presence of an alkylating catalyst at a temperature in the range of about 0 to about 200° C., preferably 0 to 100° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

Polyolefins suitable for forming the high molecular weight alkyl-substituted hydroxyaromatic compounds include polypropylene, polybutenes, polyisobutylene, copolymers of butylene and/or butylene and propylene, copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the high molecular weight alkyl-substituted hydroxyaromatic compounds are substantially aliphatic hydrocarbon polymers.

The term "polybutylene" is used herein in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins. So-called high reactivity polyisobutenes having relatively high proportions of polymer molecules having a terminal vinylidene group are also suitable for use in forming the long chain alkylated phenol reactant. Suitable high-reactivity polyisobutenes include those polyisobutenes that comprise at least about 20% of the more reactive methylvinylidene isomer, preferably at least 50% and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808, which are both incorporated herein by reference.

The Mannich detergent may be made from a high molecular weight alkylphenol or alkylcresol. However, other phenolic compounds may be used including high molecular weight alkyl-substituted derivatives of resorcinol, hydroquinone, catechol, hydroxydiphenyl, benzylphenol, phenethylphenol, naphthol, tolylnaphthol, among others. Preferred for the preparation of the Mannich detergents are the polyalkylphenol and polyalkylcresol reactants, e.g., polypropylphenol, polybutylphenol, polypropylcresol and polybutylcresol, wherein the alkyl group has a number average molecular weight of about 500 to about 2100 as measured by GPC using polystyrene as reference, or as another example the alkyl group is a polybutyl group derived from polyisobutylene having a number average molecular weight in the range of about 700 to about 1300 as measured by GPC using polystyrene as reference.

One suitable configuration of the high molecular weight alkyl-substituted hydroxyaromatic compound is that of a para-substituted mono-alkylphenol or a para-substituted mono-alkyl ortho-cresol. However, any hydroxyaromatic compound readily reactive in the Mannich condensation reaction may be employed. Thus, Mannich products made from hydroxyaromatic compounds having only one ring alkyl substituent, or two or more ring alkyl substituents are suitable for use in this invention. The long chain alkyl substituents may contain some residual unsaturation, but in general, are substantially saturated alkyl groups.

Representative amine reactants include, but are not limited to, alkylene polyamines having at least one suitably reactive primary or secondary amino group in the molecule. Other substituents such as hydroxyl, cyano, amido, etc., can be present in the polyamine. In an embodiment, the alkylene polyamine is a polyethylene polyamine. Suitable alkylene polyamine reactants include ethylenediamine, diethylenetriamine, triethylenetetramine, tetraethylenepentamine and mixtures of such amines having nitrogen contents corresponding to alkylene polyamines of the formula $H_2N-(A-NH—)_nH$, where A in this formula is divalent ethylene or propylene and n is an integer of from 1 to 10, preferably 1 to 4. The alkylene polyamines may be obtained by the reaction of ammonia and dihalo alkanes, such as dichloro alkanes.

The amine may also be an aliphatic diamine having one primary or secondary amino group and at least one tertiary amino group in the molecule. Examples of suitable polyamines include N,N,N",N"-tetraalkyldialkylenetriamines (two terminal tertiary amino groups and one central secondary amino group), N,N,N',N"-tetraalkyltrialkylenetetramines (one terminal tertiary amino group, two internal tertiary amino groups and one terminal primary amino group), N,N,N',N",N'''-pentaalkyltrialkylenetetramines (one terminal tertiary amino group, two internal tertiary amino groups and one terminal secondary amino group), N,N-dihydroxyalkyl-alpha-, omega-alkylenediamines (one terminal tertiary amino group and one terminal primary amino group), N,N,N'-trihydroxyalkyl-alpha, omega-alkylenediamines (one terminal tertiary amino group and one terminal secondary amino group), tris(dialkylaminoalkyl)aminoalkylmethanes (three terminal tertiary amino groups and one terminal primary amino group), and similar compounds, wherein the alkyl groups are the same or different and typically contain no more than about 12 carbon atoms each, and which preferably contain from 1 to 4 carbon atoms each. These alkyl groups may be methyl and/or ethyl groups. Suitable polyamine reactants are N,N-dialkyl-alpha, omega-alkylenediamine, such as those having from 3 to about 6 carbon atoms in the alkylene group and from 1 to about 12 carbon atoms in each of the alkyl groups, which most preferably are the same but which can be different. Also suitable are N,N-dimethyl-1,3-propanediamine and N-methyl piperazine.

Examples of polyamines having one reactive primary or secondary amino group that can participate in the Mannich condensation reaction, and at least one sterically hindered amino group that cannot participate directly in the Mannich condensation reaction to any appreciable extent include N-(tert-butyl)-1,3-propanediamine, N-neopentyl-1,3-propanediamine-, N-(tert-butyl)-1-methyl-1,2-ethanediamine, N-(tert-butyl)-1-methyl-1,3-propanediamine, and 3,5-di(tert-butyl)aminoethylpiperazine.

Representative aldehydes for use in the preparation of the Mannich base products include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

Suitable Mannich base detergents include those detergents taught in U.S. Pat. Nos. 4,231,759; 5,514,190; 5,634,951; 5,697,988; 5,725,612; and 5,876,468, the disclosures of which are incorporated herein by reference.

Another suitable additional fuel additive may be hydrocarbyl amine detergents. If used, the fuel composition may include about 45 to about 1000 ppm of the hydrocarbyl amine detergent. One common process involves halogenation of a long chain aliphatic hydrocarbon such as a polymer of ethylene, propylene, butylene, isobutene, or copolymers such as ethylene and propylene, butylene and isobutylene, and the like, followed by reaction of the resultant halogenated hydrocarbon with a polyamine. If desired, at least some of the product can be converted into an amine salt by treatment with an appropriate quantity of an acid. The products formed by the halogenation route often contain a small amount of residual halogen such as chlorine. Another way of producing suitable aliphatic polyamines involves controlled oxidation (e.g., with air or a peroxide) of a polyolefin such as polyisobutene followed by reaction of the oxidized polyolefin with a polyamine. For synthesis details for preparing such aliphatic polyamine detergent/dispersants, see for example U.S. Pat. Nos. 3,438,757; 3,454,555; 3,485,601; 3,565,804; 3,573,010; 3,574,576; 3,671,511; 3,746,520; 3,756,793; 3,844,958; 3,852,258; 3,864,098; 3,876,704; 3,884,647; 3,898,056; 3,950,426; 3,960,515; 4,022,589; 4,039,300; 4,128,403; 4,166,726; 4,168,242; 5,034,471; 5,086,115; 5,112,364; and 5,124,484; and published European Patent Application 384,086. The disclosures of each of the foregoing documents are incorporated herein by reference. The long chain substituent(s) of the hydrocarbyl amine detergent most preferably contain(s) an average of 40 to 350 carbon atoms in the form of alkyl or alkenyl groups (with or without a small residual amount of halogen substitution). Alkenyl substituents derived from poly-alpha-olefin homopolymers or copolymers of appropriate molecular weight (e.g., propene homopolymers, butene homopolymers, C3 and C4 alpha-olefin copolymers, and the like) are suitable. The substituent may be a polyisobutenyl group formed from polyisobutene having a number average molecular weight (as determined by gel permeation chromatography) in the range of 500 to 2000, preferably 600 to 1800, most preferably 700 to 1600.

Polyetheramines are yet another suitable additional detergent chemistry used in the methods of the present disclosure. If used, the fuel composition may include about 45 to about 1000 ppm of the polyetheramine detergents. The polyether backbone in such detergents can be based on propylene oxide, ethylene oxide, butylene oxide, or mixtures of these. Propylene oxide or butylene oxide or mixtures thereof may impart good fuel solubility. The polyetheramines can be monoamines, diamines or triamines. Examples of commercially available polyetheramines are those under the tradename Jeffamines™ available from Huntsman Chemical company and the poly(oxyalkylene)carbamates available from Chevron Chemical Company. The molecular weight of the polyetheramines will typically range from 500 to 3000. Other suitable polyetheramines are those compounds taught in U.S. Pat. Nos. 4,191,537; 4,236,020; 4,288,612; 5,089,029; 5,112,364; 5,322,529; 5,514,190 and 5,522,906.

In some approaches, one or more liquid carriers or induction aids may be used. Such carriers can be of various types, such as for example liquid poly-α-olefin oligomers, mineral oils, liquid poly(oxyalkylene) compounds, liquid alcohols or polyols, polyalkenes, liquid esters, and similar liquid carriers. Mixtures of two or more such carriers can be employed.

Exemplary liquid carriers may include a mineral oil or a blend of mineral oils that have a viscosity index of less than about 120; one or more poly-α-olefin oligomers; one or more poly(oxyalkylene) compounds having an average molecular weight in the range of about 500 to about 3000; polyalkenes; polyalkyl-substituted hydroxyaromatic compounds; or mixtures thereof. The mineral oil carrier fluids that can be used include paraffinic, naphthenic and asphaltic oils, and can be derived from various petroleum crude oils and processed in any suitable manner. For example, the mineral oils may be solvent extracted or hydrotreated oils. Reclaimed mineral oils can also be used. Hydrotreated oils are the most preferred. Preferably the mineral oil used has a viscosity at 40° C. of less than about 1600 SUS, and more preferably between about 300 and 1500 SUS at 40° C. Paraffinic mineral oils most preferably have viscosities at 40° C. in the range of about 475 SUS to about 700 SUS. In some instances, the mineral oil may have a viscosity index of less than about 100, in other instances, less than about 70 and, in yet further instances, in the range of from about 30 to about 60.

The poly-α-olefins (PAO) suitable for use as carrier fluids are the hydrotreated and unhydrotreated poly-α-olefin oligomers, such as, hydrogenated or unhydrogenated products, primarily trimers, tetramers and pentamers of alpha-olefin monomers, which monomers contain from 6 to 12, generally 8 to 12 and most preferably about 10 carbon atoms. Their synthesis is outlined in Hydrocarbon Processing, February 1982, page 75 et seq., and in U.S. Pat. Nos. 3,763,244; 3,780,128; 4,172,855; 4,218,330; and 4,950,822. The usual process essentially comprises catalytic oligomerization of short chain linear alpha olefins (suitably obtained by catalytic treatment of ethylene). The poly-α-olefins used as carriers will usually have a viscosity (measured at 100° C.) in the range of 2 to 20 centistokes (cSt). The poly-α-olefin may have a viscosity of at least 8 cSt, and most preferably about 10 cSt at 100° C.

Suitable poly (oxyalkylene) compounds for the carrier fluids may be fuel-soluble compounds which can be represented by the following formula

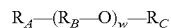

wherein $R_A$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_B$ is an alkylene group having 2 to 10 carbon atoms (preferably 2-4 carbon atoms), $R_C$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and w is an integer from 1 to 500 and preferably in the range of from 3 to 120 representing the number (usually an average number) of repeating alkyleneoxy groups. In compounds having multiple —$R_B$—O— groups, $R_B$ can be the same or different alkylene group and where different, can be arranged randomly or in blocks. Suitable poly (oxyalkylene) compounds include monools comprised of repeating units formed by reacting an alcohol with one or more alkylene oxides, one alkylene oxide, or propylene oxide or butylene oxide.

The average molecular weight of the poly (oxyalkylene) compounds used as carrier fluids may be in the range of from about 500 to about 3000, more preferably from about 750 to about 2500, and most preferably from above about 1000 to about 2000.

One useful sub-group of poly (oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being fully incorporated herein by reference.

Another sub-group of poly (oxyalkylene) compounds includes one or a mixture of alkylpoly (oxyalkylene)monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, or in the range of about 10 to about 18 carbon atoms, are suitable.

The poly (oxyalkylene) carriers may have viscosities in their undiluted state of at least about 60 cSt at 40° C. (in other approaches, at least about 70 cSt at 40° C.) and at least about 11 cSt at 100° C. (more preferably at least about 13 cSt at 100° C.). In addition, the poly (oxyalkylene) compounds used in the practice of this invention preferably have viscosities in their undiluted state of no more than about 400 cSt at 40° C. and no more than about 50 cSt at 100° C. In other approaches, their viscosities typically do not exceed about 300 cSt at 40° C. and typically do not exceed about 40 cSt at 100° C.

Poly (oxyalkylene) compounds also include poly (oxyalkylene) glycol compounds and monoether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least 80 mole % of the oxyalkylene groups in the molecule are derived from 1,2-propylene oxide. Details concerning preparation of such poly(oxyalkylene) compounds are referred to, for example, in Kirk-Othmer, Encyclopedia of Chemical Technology, Third Edition, Volume 18, pages 633-645 (Copyright 1982 by John Wiley & Sons), and in references cited therein, the foregoing excerpt of the Kirk-Othmer encyclopedia and the references cited therein being incorporated herein by reference. U.S. Pat. Nos. 2,425,755; 2,425,845; 2,448,664; and 2,457,139 also describe such procedures, and are fully incorporated herein by reference.

The poly (oxyalkylene) compounds, when used, typically will contain a sufficient number of branched oxyalkylene units (e.g., methyldimethyleneoxy units and/or ethyldimethyleneoxy units) to render the poly (oxyalkylene) compound gasoline soluble. Suitable poly (oxyalkylene) compounds include those taught in U.S. Pat. Nos. 5,514,190; 5,634,951; 5,697,988; 5,725,612; 5,814,111 and 5,873,917, the disclosures of which are incorporated herein by reference.

The polyalkenes suitable for use as carrier fluids include polypropene and polybutene. The polyalkenes may have a polydispersity (Mw/Mn) of less than 4. In one embodiment, the polyalkenes have a polydispersity of 1.4 or below. In general, polybutenes have a number average molecular weight (Mn) of about 500 to about 2000, preferably 600 to about 1000, as determined by gel permeation chromatography (GPC). Suitable polyalkenes for use in the present invention are taught in U.S. Pat. No. 6,048,373.

The polyalkyl-substituted hydroxyaromatic compounds suitable for use as carrier fluid include those compounds known in the art as taught in U.S. Pat. Nos. 3,849,085; 4,231,759; 4,238,628; 5,300,701; 5,755,835 and 5,873,917, the disclosures of which are incorporated herein by reference.

Various compounds known for use as oxidation inhibitors can be utilized in the practice of this invention. These include phenolic antioxidants, amine antioxidants, sulfurized phenolic compounds, and organic phosphites, among others. The antioxidant may be composed predominantly or entirely of either (1) a hindered phenol antioxidant such as 2-tert-butylphenol, 2,6-di-tert-butylphenol, 2,4,6-tri-tert-butylphenol, 4-methyl-2,6-di-tert-butylphenol, 4,4'-methylenebis(2,6-di-tert-butylphenol), and mixed methylene bridged polyalkyl phenols, or (2) an aromatic amine antioxidant such as the cycloalkyl-di-lower alkyl amines, and phenylenediamines, or a combination of one or more such phenolic antioxidants with one or more such amine antioxidants. Suitable for use in the practice of this invention are tertiary butyl phenols, such as 2,6-di-tert-butylphenol, 2,4,6-tri-tert-butylphenol, o-tert-butylphenol, and mixtures thereof.

A wide variety of demulsifiers are available for use in the practice of this invention, including, for example, polyoxyalkylene glycols, oxyalkylated phenolic resins, and like materials. Particularly preferred are mixtures of, polyoxyalkylene glycols and oxyalkylated alkylphenolic resins, such as are available commercially from Petrolite Corporation under the TOLAD trademark. One such proprietary product, identified as TOLAD 9308, is understood to be a mixture of these components dissolved in a solvent composed of heavy aromatic naphtha and isopropanol. This product has been found efficacious for use in the compositions of this invention. However, other known demulsifiers can be used such as TOLAD 286.

A variety of materials are available for use as corrosion inhibitors in the practice of this invention. Thus, use can be made of dimer and trimer acids, such as are produced from tall oil fatty acids, oleic acid, linoleic acid, or the like. Products of this type are currently available from various commercial sources, such as, for example, the dimer and trimer acids sold under the HYSTRENE trademark by the Humko Chemical Division of Witco Chemical Corporation and under the EMPOL trademark by Henkel Corporation. Another useful type of corrosion inhibitor for use in the practice of this invention are the alkenyl succinic acid and alkenyl succinic anhydride corrosion inhibitors such as, for example, tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride, and the like. Also useful are the half esters of alkenyl succinic acids having 8 to 24 carbon atoms in the alkenyl group with alcohols such as the polyglycols. Also useful are the aminosuccinic acids or derivatives thereof represented by the formula:

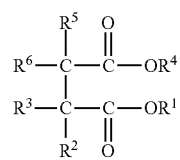

wherein each of $R^2$, $R^3$, $R^5$ and $R^6$ is, independently, a hydrogen atom or a hydrocarbyl group containing 1 to 30 carbon atoms, and wherein each of $R^1$ and $R^4$ is, independently, a hydrogen atom, a hydrocarbyl group containing 1 to 30 carbon atoms, or an acyl group containing from 1 to 30 carbon atoms.

The groups $R^1$, $R^2$, $R^3$, $R^4$, $R^5$ and $R^6$ when in the form of hydrocarbyl groups, can be, for example, alkyl, cycloalkyl or aromatic containing groups. Preferably $R^1$, $R^2$, $R^3$, $R^4$, and $R^5$ are hydrogen or the same or different straight-chain or branched-chain hydrocarbon radicals containing 1-20 carbon atoms. Most preferably, $R^1$, $R^2$, $R^3$, $R^4$, and $R^5$ are hydrogen atoms. $R^6$ when in the form of a hydrocarbyl group is preferably a straight-chain or branched-chain saturated hydrocarbon radical.

A particular example is a tetralkenyl succinic acid of the above formula wherein $R^1$, $R^2$, $R^3$, $R^4$, and $R^5$ are hydrogen and $R^6$ is a tetrapropenyl group.

One or more additional optional fuel additives may be also present in the fuel additive packages or fuel compositions of the disclosed embodiments. For example, the fuel additives may contain conventional quantities of octane improvers, cold flow improvers (CFPP additive), pour point depressants, solvents, lubricity additives, friction modifiers, amine stabilizers, combustion improvers, dispersants, heat stabilizers, conductivity improvers, metal deactivators, carrier fluid, marker dyes, organic nitrate ignition accelerators, cyclomatic manganese tricarbonyl compounds, and the like. Similarly, the fuels may contain suitable amounts of conventional fuel blending components such as methanol, ethanol, dialkyl ethers, 2-ethylhexanol, and the like.

Post-Installation Methods of Treating Gasoline Particulate Filters

B. Lubricant Additives as Dopants

In other examples, the priming composition contains one or more additives not typically used as fuel additives. In some cases, additives developed for use in engine oil formulations may be used. In some examples, the additives are used neat as the priming composition. In other examples, the additives may be solubilized in a base oil to create a lubricant formulation that is used as the priming composition. A lubricant formulation typically is made of lubricant additives and a base oil.

The filtration efficiency of a GPF installed in a newly manufactured vehicle and exposed to particulate matter produced by the priming composition comprising lubricant additives may be quantified by initial miles and/or engine time, as described above. The GPF treated by the methods may have any of the filtration efficiencies described above.

Additives may include one or more of antioxidants, antiwear agents, boron-containing compounds, detergents, dispersants, friction modifiers, molybdenum-containing components, transition metal-containing components, viscosity index improvers, and other optional additives added to an engine oil to form a lubricant formulation.

In some examples, the priming composition includes at least one compound containing a chemical element selected from the group consisting of Ca, Mg, Mo, Zn, P, Ti, Mn, W, Na, and K. In some examples, the metal-containing compounds are introduced by specific additives. It is understood that the metallic elements often may be present in ionic form. Alternately, the metallic element may be present in an organometallic form. Metal-containing compounds contribute to the formation of ash, which can be estimated by testing the lubricant formulation for SASH. In some cases, a base oil may be used to solubilize the additives in a lubricant formulation.

Both the mass of the ash or the oil SASH value and the chemistry of the lubricant additives are important to ensure correct particulate substance accumulation. The SASH value is important as it dictates the rate of ash accumulation in the GPF relative to the amount of lubricant formulation additive combusted. The ratio is important since the rate of ash accumulation must be controlled in such a way to be rapid while not adding so much lubricant formulation as to negatively impact combustion in the engine. An example of a SASH amount in the lubricant formulation that has shown utility is presented in Table 2. To effectively accomplish the ash loading goals and not cause other emissions systems problems (e.g., the blocking of the 3-way catalyst system or the fouling of the vehicle oxygen sensors), the chemistry of the lubricant formulation must be carefully controlled. Non-limiting examples of suitable fuel and lubricant formulations are presented in Table 1 and Table 2, respectively, which in combination serve as an example of a satisfactorily blended priming composition.

In some cases, the priming composition may also include have a fuel. The amount of lubricant formulation added to the fuel can be adjusted in order to achieve the desired filtration efficiency based on the fuel consumption rate and the distance permitted prior to the certification testing. In some examples where the priming composition further includes fuel, the lubricant formulation is present in the fuel in an amount of no more than 3 wt. % based on the weight of the priming composition. In other examples, the lubricant formulation is present in the fuel in an amount of no more than 2.5 wt. %, no more than 2.0 wt. %, no more than 1.5 wt. %, or no more than 1.0 wt. %, based on the weight of the priming composition.

While regulatory trends have precipitated a move to low-ash lubricant formulations, in practicing the methods disclosed herein it may be beneficial to utilize lubricant formulations having a higher ash-producing capability, such as using an older formulation. In some examples, the lubricant formulation has a SASH value of at least 3%, as measured by ASTM D874 (2018). In other examples, the lubricant formulation has a SASH value of at least 3%, at least 3.5%, at least 4%, at least 4.5%, or at least 5%, as measured by ASTM D874 (2018).

The composition and methods disclosed herein may be used with particulate filter, including particulate filters for diesel engines.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Example 1: Improved Filtration Efficiency Using a Priming Composition

As detailed above, improved methods of improving early GPF filtration efficiency may include contacting the filter with an exhaust stream from an engine burning a priming composition having fuel doped with a lubricant formulation comprising motor oil additives.

In this Example, the fuel employed had the characteristics summarized in Table 1:

TABLE 1

Example Fuel Properties.

| Properties | Unit | Results |
|---|---|---|
| Density | kg/m3 | 765.7 |
| Sulfur | mg/kg | 6.1 |
| Oxygenates | % (mass) | 4.26 |
| Oxygen | % (mass) | 0.73 |
| Methanol | % (mass) | 0.13 |
| RVP | kPa | 48 |
| Unwashed gum | mg/100 ml | 0.8 |
| Washed gum | mg/100 ml | <0.5 |
| Benzene | % (vol) | 0.13 |
| Aromatics | % (vol) | 34.4 |
| Olefins | % (vol) | 17.2 |
| Distillation | | |
| IBP | °C. | 39.6 |
| 10% | °C. | 61.9 |
| 50% | °C. | 107.7 |
| 90% | °C. | 184.3 |
| FBP | °C. | 201 |
| Residual | ml | 97 |
| Residual percentage | % (vol) | 1.1 |
| RON | | 91.8 |
| Distillation index | | 608 |

The fuel was doped with the lubricating composition described in Table 2. The amount of the lubricating composition compounded with a package of inorganic and organic additives was 2 weight percent based on the total weight of the lubricant formulation plus fuel.

TABLE 2

Example Lubricant oil properties

| Properties | Unit | Results |
|---|---|---|
| Kv40 | mm2/s | 71.96 |
| Kv100 | mm2/s | 12.13 |
| CCS-30 | mPa · s | 5900 |
| TBN | | 6.76 |
| SAP | | 0.87 |
| MRV (−35°) | | 26852 |
| ICP | | |
| B | ppm | 50 |
| CA | ppm | 2120 |
| MG | ppm | 19 |
| MO | ppm | 112 |
| P | ppm | 803 |
| ZN | ppm | 889 |

A bench-mounted GDI test engine equipped with a GPF was operated using the doped fuel, and a comparative bench-mounted GDI test engine equipped with a GPF was operated using the non-doped fuel. Filtration efficiency was monitored for 10 hours. As shown in FIG. 1, the filtration efficiency of the GPF of the doped fuel example (square-shaped data points) achieved 95% filtration efficiency in less than 3 hours, compared to the comparative example (diamond-shaped data points) that required 6 hours to achieve 95% filtration efficiency. Thus, in this Example, the method resulted in dramatically improved early filtration efficiency.

Other embodiments of the present disclosure will be apparent to those skilled in the art from consideration of the specification and practice of the embodiments disclosed herein. As used throughout the specification and claims, "a" and/or "an" may refer to one or more than one. Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. It is intended that the specification and examples be considered as exemplary only, with a true scope and spirit of the disclosure being indicated by the following claims.

The foregoing examples are susceptible to considerable variation in practice. Accordingly, the embodiments are not intended to be limited to the specific exemplifications set forth hereinabove. Rather, the foregoing embodiments are within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part hereof under the doctrine of equivalents.

It is to be understood that each component, compound, substituent or parameter disclosed herein is to be interpreted as being disclosed for use alone or in combination with one or more of each and every other component, compound, substituent or parameter disclosed herein.

It is also to be understood that each amount/value or range of amounts/values for each component, compound, substituent or parameter disclosed herein is to be interpreted as also being disclosed in combination with each amount/value or range of amounts/values disclosed for any other component(s), compounds(s), substituent(s) or parameter(s) disclosed herein and that any combination of amounts/values or ranges of amounts/values for two or more component(s), compounds(s), substituent(s) or parameters disclosed herein are thus also disclosed in combination with each other for the purposes of this description.

It is further understood that each range disclosed herein is to be interpreted as a disclosure of each specific value within the disclosed range that has the same number of significant digits. Thus, a range of from 1-4 is to be interpreted as an express disclosure of the values 1, 2, 3 and 4.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

What is claimed is:

1. A method of increasing an initial in-service filtration efficiency of a gasoline particulate filter used with a gasoline direct injection engine, the method comprising:
   contacting a newly installed gasoline particulate filter with an exhaust stream comprising particulate matter derived from combusting gasoline including a priming composition in a direct injection engine, wherein the priming composition comprises at least one compound containing a chemical element selected from the group consisting of Mg, Mo, Ti, W, Na, and K; and
   wherein the priming composition produces combustion products including soot and ash that is accumulated on the gasoline particulate filter to achieve cake filtration with 0.5 g/L to 6 g/L of the soot and ash on the gasoline particulate filter within an initial 500 miles after installation of the gasoline particulate filter.

2. The method of claim 1, wherein the priming composition further comprises a fuel.

3. The method of claim 1, further comprising measuring a filtration efficiency of the gasoline particulate filter contacted with the priming composition, wherein the filtration efficiency is greater than 80% after 100 initial miles.

4. The method of claim 1, further comprising:
   treating a fuel tank with the priming composition during original equipment manufacturing, and
   adding a fuel to the fuel tank.

* * * * *